2,501,945

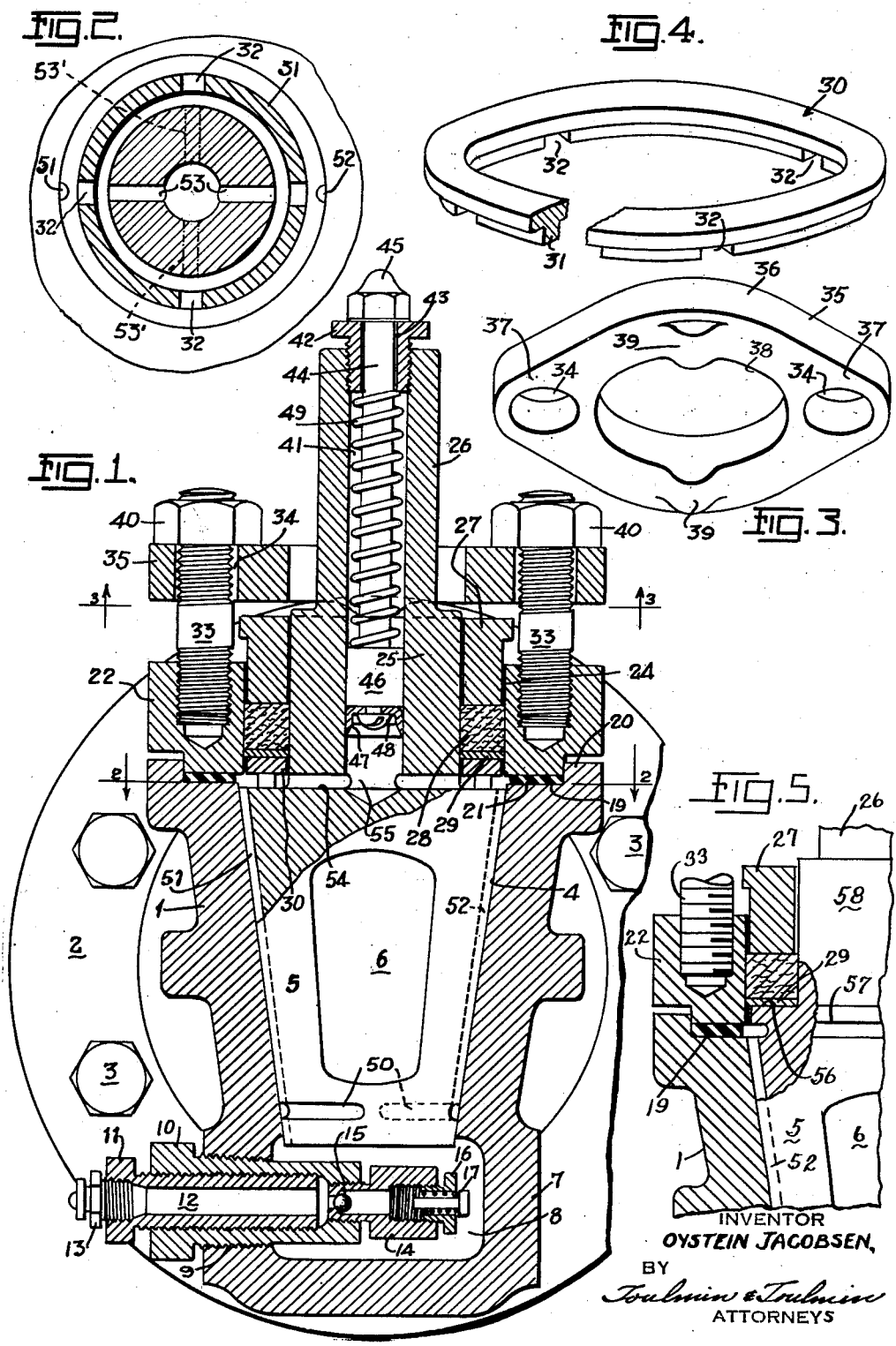
March 28, 1950 — O. JACOBSEN — 2,501,945
PLUG COCK VALVE
Filed March 31, 1944
INVENTOR
OYSTEIN JACOBSEN,
BY
Toulmin & Toulmin
ATTORNEYS Patented Mar. 28, 1950

UNITED STATES PATENT OFFICE 2,501,945

PLUG COCK VALVE

Oystein Jacobsen, Montgomery County, Ohio, assignor to The Duriron Company, Inc., Dayton, Ohio, a corporation of New York Application March 31, 1944, Serial No. 528,873

2 Claims. (Cl. 251—93)

1

The present invention relates to valves for controlling the flow of liquids and more particularly to those valves of the plug cock type. It is customary in valves of this character to employ a lubricating system by which the lubricant is applied to the bearing surfaces at the valve seat. The lubricant is contained in a reservoir and subjected to pressure by a set screw or other form of plunger to force the lubricant through passageways which are provided in the plug and/or in a coupling body at the position of the valve seat. These passageways usually take the form of grooves which extend annularly around the plug and connect with grooves extending longitudinally of the plug. The groove system is in communication with the lubricant reservoir.

One of the annular grooves is usually positioned at a definite distance from the upper surface of the conical plug and when the source of lubricant under pressure is introduced into the groove system from the bottom of the plug there may be left a substantial portion of the valve seat located between the upper annular groove and the top of the plug which receives little or no lubricant. The liquid under pressure which is being controlled by the valve may find access to this lubricant-free surface and cause corrosion particularly when the liquid contains an acid which readily attacks the metals of the plug and valve body.

The primary object of the invention is to provide a valve construction in which lubrication is obtained throughout the entire length of the plug and more particularly at those places where the plug bears against the valve seat.

Another object is to provide an improved valve in which oil or grease may be evenly distributed over all of the bearing surfaces between the plug and the valve seat.

Still another object is to provide an improved valve of the plug cock type in which a lubricant is applied against all portions of the valve seat and under a steady and relatively constant pressure.

The above objects are attained in brief by utilizing a system of longitudinal and transversely extending grooves positioned at strategic positions about the plug and in which the groove system extends throughout the entire bearing surface of the plug with respect to its seat. The arrangement is such that the uppermost annular groove is positioned above the upper surface of the plug so that all of the bearing surfaces are subjected to the lubricating effect of at least one of the grooves.

2

The invention will be better understood when reference is made to the following description and the accompanying drawings in which:

Figure 1 represents a vertical cross-sectional view through the improved valve but showing some of the machine elements and also portions of the plug in elevation.

Figure 2 is a transverse cross-sectional view taken along line 2—2 in Figure 1.

Figure 3 is a perspective view of the plate by which pressure is introduced against the packing ring gland. This view has been taken at the approximate position indicated by line 3—3 in Figure 1.

Figure 4 is a perspective view with a short section broken away of an improved spacer ring positioned between the packing material and the upper surface of the plug.

Figure 5 is a fragmentary sectional view of a modified form of plug valve improved in accordance with the principles of the present invention.

Referring more particularly to Figure 1, reference character 1 designates the side walls of the main valve casting which terminate at each end in a flange coupling 2 provided with bolts 3 for securing the valve between separated ends of a pair of conduits (not shown). The valve casting is provided with a conically shaped opening 4 which extends at right angles to the main openings through the conduits and is adapted rotatably to receive the plug portion 5 of the valve. This plug is provided with a transversely extending opening 6. The arrangement is such that when this opening is in line with the openings in the conduits, the valve is in open position.

The casting 1 is provided with an integrally connecting extension 7 which contains a chamber or compartment 8 completely closed except for a transversely extending bore 9. This bore is threaded to receive a screw plug 10 which has an internally threaded bore to engage the threaded shank of an inner screw 11. The latter has an opening 12 extending longitudinally therethrough which may be closed by a check valve 13. The plug 10 extends into the chamber 8 for a considerable distance and is provided at its inner end with a tapped hole for receiving a check valve member provided with a head 14. This check valve member has several longitudinally extending openings of different size and there is a ball check valve 15 bearing against the opening of smallest diameter, while at the opposite end, the check valve member 14 receives a cap screw 16 containing a spring-urged pin form of check valve 17. The purpose of the check valves 15 and 17 is to permit the introduction of a lubricant, oil or grease, under pressure at the screw check 13, while at the same time preventing any escape of the lubricant from the chamber 8. By turning the screw plug 11 the lubricant in the chamber 8 can be placed under greater pressure.

The upper end of the valve casting 1 is provided with a countersunk recess 19 so as to leave a shoulder 20. The recess is positioned at about the same height as the upper surface of the plug 5. A gasket 21 may be positioned within the recess to prevent any leakage of fluid at the joint. A metal plate 22 of any suitable shape and having a circular shoulder extension 23 which fits snugly within the shouldered flange may be secured to the valve casting in any suitable and well known manner. This plate is provided with a bore 24 with approximately the same size as the maximum diameter of the plug.

The plug 5 terminates at its upper end in shouldered shaft portions 25, 26, the diameter of the shaft portion 25 being considerably less than that of the bore 24 so as to leave an annular space therebetween. There is a gland member 27 loosely fitted within this annular space and resting on a plurality of layers of packing material 28. This material may be supported on a gasket 29 which in turn rests on a spacing washer 30.

An enlarged view of the spacing washer 30 is shown in Figure 4. In general, it has preferably a T-shaped section in which the vertical leg 31 of the section is positioned approximately midway of the two outermost edges. This vertical leg is slotted as indicated at 32 at a plurality of equidistantly spaced positions for reasons which will be explained presently. The plate 22 is provided with a pair of threaded openings for receiving studs 33 which pass loosely through openings 34 in a plate 35 positioned directly over the plate 22. A perspective view of the plate 35 is shown in Figure 3 and as illustrated, this plate may comprise a central portion 36 and two oppositely extending wing portions 37 at the position of the openings 34. The plate has a large central bore 38 which readily clears the shaft portion 26 of the plug stem. There is a pair of downwardly extending projections 39 on opposite sides of the bore 38, these projections taking on a curvilinear shape. These projections are so positioned that they will bear against the upper surface of the gland member 27 when the plate nuts 40 on studs 33 are tightened. Thus, pressure may be exerted on the packing member 28 to prevent leakage of fluid or oil upwardly from the top of the plug 5.

The shaft portions 25, 26 are provided with an axially extending bore 41 which is plugged at the top by a threaded sleeve 42 having a longitudinal opening 43 therein. A rod 44 loosely extends through said opening, this rod being threaded at the top to receive a nut 45. The lower end of the rod terminates in a plunger 46 carrying a cup leather gasket 47 screwed thereto as indicated at 48. There is a compression spring 49 surrounding the rod 44 and positioned between the upper end of the plunger 46 and the lower end of the sleeve 42. The purpose of the plunger 46 and the compression spring 49 will be explained hereinafter.

In order to lubricate all portions of the plug where it bears against the valve seat a number of grooves are employed which are in communication with the lubricant chamber 8. Near the bottom of the plug there is a pair of peripherally extending grooves 50 which are disposed on opposite sides of the plug but do not connect with one another. At one position on the plug and connecting with one of the grooves 50 there is a groove 51 which extends longitudinally of the plug throughout its entire length. There is a similar groove 52 at the opposite side of the plug but this groove stops short of the bottom of the plug and terminates at the right hand arcuate groove 50. The reason for this will be clear when the operation of the lubricating system has been explained. As shown in Figure 2 there is a pair of radially extending openings passing through the shaft portion 25 at a position immediately above the upper surface 54 of the plug 5. The openings communicate at their inner ends with the chamber just below the gasket 47 and formed within the bore 41. These openings 53 are in line with one pair of the slots 32 of the washer 30 and also in line with the grooves 51 and 52 as can be seen in Figure 2. As the plug 5 and its stem portions 25, 26 are rotated through approximately 90° in order to place the valve in its closed valve position the openings 53 will have swung to a new position indicated at 53' (Figure 2) in line with the adjacent pair of slots 32 in the washer 30.

Assume that the plug 5 is in the valve-open position as shown in Figure 1, i. e. the opening 6 is in line with the openings in the incoming and outgoing conduits (not shown) through which fluid is passing, it is apparent that the lubricant in the chamber 8 which has been placed under pressure will flow through the entire network of grooves in the plug and in its stem. Thus, the grease or oil will be forced upwardly through the groove 51 and then through one of the slots 32 and through the opening 54 into the compartment 55. As pressure is increased on the lubricant in the chamber 8 by the screw 11 the entire compartment 55 is filled with lubricant and the plunger 46 is caused to move upwardly against the spring 49. The lubricant will obviously also flow through the opening 53 to the right of the compartment 55 and then through one of the slots 32 into the longitudinal groove 52. The grease in the slots 51, 52 will also flow around the arcuate grooves 50 at the bottom of the plug so that as the latter is rotated from the open to closed valve position a film of lubricant is distributed throughout the entire valve seat. By discontinuing the lower end of the groove 52 at the right hand arcuate groove 50 and in order for the lubricant to reach the latter groove it is necessary that it flow through the entire system of grooves, i. e. the long way around, thus insuring that the lubricant is caused to move over long distances and lubricate relatively large surfaces. The effect of the plunger 46 is to maintain a constant pressure on the lubricant contained within the compartment 55 and therefore assure a steady flow of lubricant throughout the entire groove system even if minute leaks should appear in any of the joints which might normally cause a loss in pressure. It will be understood that when the screw 11 or the screw 13 is tightened, only a momentary increase in pressure of the lubricant is obtained, so that the plunger 46 serves the purpose of maintaining a constant pressure on the lubricant even in the absence of any tightening effect of either of these screws. As the lubricant becomes used up, and assuming that no pressure is added by either screw, the plunger 46 will be forced downwardly by the spring 49 tending to maintain a constant pressure even when the quantity of lubricant becomes less. The spring-urged plunger structure shown and described does not form part of the present invention but has been disclosed and claimed in my co-pending application Ser. No. 511,519, filed November 24, 1943.

Prior to my invention it was customary to provide a peripherally extending groove about the plug 5 and positioned a short distance below the upper surface 54 of the plug. However, I have found that it was very difficult, if not impossible, to provide adequate lubrication to that portion of the plug surface positioned between the upper edge of this groove and the uppermost surface 54 of the plug. Under these circumstances the lubricant would be forced upwardly from the chamber 8 through the groove 51 and then through the upper or peripherally extending groove to the downwardly extending groove 52, thus by-passing that portion of the plug surface positioned between this upper groove and the top of the plug. This may lead to the failure of the valve as well as making it difficult to turn, particularly in case the fluid being controlled is of a corrosive acid-containing nature. It will be understood in this connection that the lubricant protects the surface from corrosive or other deleterious effects such as oxidation, etc.

In accordance with the present invention the lubricant is forced to travel over the top of the plug 5 in moving between the upper ends of the grooves 51 and 52 so that the entire length of the plug is exposed to a lubricating effect. It might be added in this connection that even though the groove 52 does not extend all the way to the lower surface of the plug, nevertheless there is no lubricant-free surface between the right hand groove 50 and the bottom of the plug because the lubricant in traveling downwardly through the entire length of the groove 52 is bound to work its way past the right hand lower groove 50 and thus leaving no part of the plug free from lubricant.

The ring 30 by reason of its T-shaped section, provides in effect on opposite sides of the leg 31 a pair of peripherally extending grooves which assure ready passage of lubricant from the groove 51 across the plug to the groove 52 and also extreme effectiveness in subjecting the lubricant to pressure by the plug 46. The use of this ring therefore represents a considerable saving in labor and other expense since it eliminates any necessity for providing a peripherally extending groove within the plug 5. In addition, the ring serves as a solid support for the packing material 28.

In Figure 5 I have shown another form which the invention may take in providing the facility of lubrication over the entire sealing surface of the plug. In general, the structure shown in Figure 5 differs from that illustrated and explained in connection with Figure 1 in that the ring 30 is formed integral with the plug. The plug 5 is extended up beyond the gasket 19 as far as the surface 56. The washer 29 rests on this surface as in the case of the modification shown in Figure 1. At a position directly opposite the gasket 19 the plug is provided with a peripherally extending groove 57 which is in communication with the longitudinal grooves 52. A pair of radially extending openings (not shown) are provided in the plug at the height of the groove 57 similar to the openings 53 shown in Figure 2. It will be understood that the upper portion 58 of the plug is provided with a chamber 41 and the spring pressed plunger 46 as explained hereinbefore and this chamber communicates with the radially extending openings.

The structure shown in Figure 5 offers all of the advantages that were explained in connection with Figure 1 in that as the piston 46 bears against the lubricant in the compartment 55 the lubricant is forced through the radial openings (not shown in Figure 5) and into the peripheral groove 57, thus maintaining a pressure on the lubricant in the longitudinal grooves 52 throughout the entire length of the bearing surfaces of the plug. There is therefore no part of the plug where it bears against the seat of the valve body which is not lubricated. It may be desirable to form the shoulder of the plug which is positioned between the upper surfaces of the groove 57 and the top surface 56 of the plug of slightly smaller diameter than the opening in the metal plate 22 in order to eliminate as much friction as possible since this portion of the plug does not constitute an active surface of the valve.

It will be understood that I desire to comprehend within my invention such modifications as come within the scope of the claims and the invention.

Having thus fully described my invention, what I claim as new and desire to secure by Letters Patent is:

1. A valve for controlling the flow of fluid through a coupling, said coupling being provided with a main passageway and an angularly positioned bore communicating therewith, said bore constituting a valve seat, a plug for the valve and adapted to rotate in said seat, a stem for said plug of smaller diameter than said plug, a clamp plate surrounding said stem and spaced therefrom to leave an annular opening, packing within said opening and a spacer for spacing the packing away from the plug, a gland for holding said packing in position and a gland plate detachably secured to said clamp plate for applying pressure to said gland, said spacer being provided with radial openings through which lubricant can pass, a lubricant containing chamber within said stem, and an opening leading from said chamber to the opening in said spacer.

2. A valve for controlling the flow of fluid through a coupling, said coupling being provided with a main passageway and an angularly positioned bore communicating therewith, said bore constituting a valve seat, a plug for the valve and adapted to rotate in said seat, a stem for said plug of smaller diameter than said plug, a clamp plate surrounding said stem and spaced therefrom to leave an annular opening, packing within said opening and a spacer for spacing the packing away from the plug, a gland for holding said packing in position and a gland plate detachably secured to said clamp plate for applying pressure to said gland, said spacer being provided with radial openings through which lubricant can pass, a lubricant containing chamber within said stem, an opening leading from said chamber to the opening in said spacer, and a spring pressed plunger in said chamber for applying pressure to the lubricant in moving through the opening in said stem and also through the opening in said spacer in order to lubricate the plug within said bore.

OYSTEIN JACOBSEN.

(References on following page)

REFERENCES CITED

The following references are of record in the file of this patent:

UNITED STATES PATENTS

| Number | Name | Date |
|---|---|---|
| 1,696,723 | Milliken | Dec. 25, 1928 |
| 1,851,259 | Martin | Mar. 29, 1932 |
| 1,937,122 | Leach | Nov. 28, 1933 |
| 1,998,029 | Simpson | Apr. 16, 1935 |
| 2,014,481 | Morehead | Sept. 17, 1935 |
| 2,021,358 | Greenwood | Nov. 19, 1935 |
| 2,058,747 | Wilkins | Oct. 27, 1936 |
| 2,065,726 | Nordstrom | Dec. 29, 1936 |
| 2,068,417 | Konkle | Jan. 19, 1937 |
| 2,070,899 | Hamer | Feb. 16, 1937 |
| 2,151,098 | Greenwood | Mar. 21, 1939 |
| 2,171,590 | Milliken | Sept. 5, 1939 |
| 2,190,602 | Leach | Feb. 13, 1940 |
| 2,232,359 | Barks | Feb. 18, 1941 |
| 2,265,526 | Henderson | Dec. 9, 1941 |
| 2,282,488 | MacClatchie | May 12, 1942 |
| 2,336,027 | Milliken | Dec. 7, 1943 |

FOREIGN PATENTS

| Number | Country | Date |
|---|---|---|
| 256,098 | Great Britain | Aug. 5, 1926 |